United States Patent
Yan et al.

(10) Patent No.: US 10,951,676 B2
(45) Date of Patent: Mar. 16, 2021

(54) FEEDBACK BASED CONTROLLER FOR VARYING CONTENT ITEM DENSITY

(71) Applicant: Microsoft Technology Licensing, LLC, Redmond, WA (US)

(72) Inventors: Jinyun Yan, Sunnyvale, CA (US); Yuan Gao, Sunnyvale, CA (US); Shaunak Chatterjee, Sunnyvale, CA (US); Gaurav Chandalia, Fremont, CA (US); Birjodh S. Tiwana, Dublin, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 18 days.

(21) Appl. No.: 16/141,642

(22) Filed: Sep. 25, 2018

(65) Prior Publication Data

US 2020/0099730 A1    Mar. 26, 2020

(51) Int. Cl.
  *G06F 15/16*    (2006.01)
  *H04L 29/06*    (2006.01)
  *G06Q 50/00*    (2012.01)

(52) U.S. Cl.
  CPC ........... *H04L 65/601* (2013.01); *G06Q 50/01* (2013.01); *H04L 65/80* (2013.01)

(58) Field of Classification Search
  None
  See application file for complete search history.

(56) References Cited

U.S. PATENT DOCUMENTS

| | | | |
|---|---|---|---|
| 9,747,618 B1* | 8/2017 | Reiss | G06Q 30/0275 |
| 10,250,928 B2* | 4/2019 | Hirsch | H04M 15/57 |
| 2008/0307454 A1* | 12/2008 | Ahanger | G06Q 30/02 725/36 |
| 2009/0030792 A1* | 1/2009 | Khivesara | G06Q 30/0253 705/14.51 |
| 2010/0211431 A1* | 8/2010 | Lutnick | G06Q 30/02 705/14.12 |
| 2011/0055007 A1* | 3/2011 | Kitagawa | G06F 9/451 705/14.49 |
| 2012/0253926 A1* | 10/2012 | Chen | G06Q 10/06 705/14.49 |
| 2012/0259989 A1* | 10/2012 | Cousins | H04L 47/263 709/228 |

(Continued)

*Primary Examiner* — Umar Cheema
*Assistant Examiner* — Tesfu N Mekonen
(74) *Attorney, Agent, or Firm* — Hickman Becker Bingham Ledesma LLP; Daniel D. Ledesma

(57) ABSTRACT

Techniques for varying content item density are provided. A first minimum gap value is stored that dictates how close two content items of a first type may appear in a content item feed that contains content items of multiple types that includes the first type and a second type. The first minimum gap value is used to place content items in a first set of content item feeds. For each content item feed of the first set of content item feeds, performance data that indicates how well content items of the first type perform in the content item feed is generated. Based on the performance data and the first minimum gap value, a second minimum gap value that is different than the first minimum gap value is generated. The second minimum gap value is used to place content items in a second plurality of content item feeds.

20 Claims, 4 Drawing Sheets

(56) References Cited

U.S. PATENT DOCUMENTS

| | | | |
|---|---|---|---|
| 2013/0080264 A1* | 3/2013 | Umeda | G06Q 30/02 |
| | | | 705/14.69 |
| 2015/0025980 A1* | 1/2015 | Zaretsky | G06Q 30/0275 |
| | | | 705/14.71 |
| 2015/0294358 A1* | 10/2015 | Galadari | G06Q 50/01 |
| | | | 705/14.55 |
| 2016/0210602 A1* | 7/2016 | Siddique | G06Q 20/0453 |
| 2016/0315981 A1* | 10/2016 | Hirsch | H04M 15/57 |
| 2017/0098237 A1* | 4/2017 | Li | G06Q 30/0244 |
| 2017/0315740 A1* | 11/2017 | Corsi | G06F 13/4282 |
| 2018/0020247 A1* | 1/2018 | Zhang | G06Q 30/02 |
| 2018/0174190 A1* | 6/2018 | Ferreira | G06Q 30/0264 |
| 2018/0174220 A1* | 6/2018 | Jadhav | G06Q 30/0631 |
| 2018/0219818 A1* | 8/2018 | Kramer | H04L 51/12 |
| 2018/0255364 A1* | 9/2018 | McFerrin | H04N 21/8146 |
| 2018/0268443 A1* | 9/2018 | Taki | G06Q 30/0267 |
| 2019/0034431 A1* | 1/2019 | Gordon | G06F 16/24578 |

* cited by examiner

FEEDBACK BASED CONTROLLER FOR VARYING CONTENT ITEM DENSITY

CROSS-REFERENCE TO RELATED APPLICATION

This application is related to U.S. application Ser. No. 16/141,669, filed Sep. 25, 2018 entitled "AUTOMATICALLY MERGING MULTIPLE CONTENT ITEM QUEUES", the entire contents of which is hereby incorporated by reference as if fully set forth herein.

TECHNICAL FIELD

The present disclosure relates to network-transferred electronic content items and, more particularly to, a feedback controller that varies density of certain types of electronic content items on different client devices

BACKGROUND

The Internet has enabled the delivery of electronic content to billions of people. Some content providers desire to send additional content items to users who visit a website hosted by a third-party publisher system. To do so, content providers may rely on a content delivery service that delivers the additional content items to computing devices of such users. In one approach, a content provider provides, to the content delivery service, data that indicates one or more user attributes that users must satisfy in order to receive the additional content items. The content delivery service creates a content delivery campaign that includes the data and is intended for sending additional content items to computing devices of users who will visit the website. However, if too many content items of a particular type are displayed at one time, then users that are not interested in content items of that type will begin to ignore those content items completely and will be less likely to interact with those content items.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method for modifying a frequency with which content items of a particular type appear in a content item feed are provided. In one technique, a minimum gap value is defined and used to dictate how close content items of the particular type may appear in web content, such as a feed. Performance of content items of the particular type is monitored and used to determine whether to adjust the minimum gap. In one technique, a PID controller is implemented that adjusts the minimum gap value in response to changes in performance.

Embodiments described herein improve computer technology. Current approaches to including content items of the particular type in web content did not consider user "blindness" of such content items when selecting how many content items to insert and/or how to space the content items in the web content. Instead, current approaches relied simply on relevancy or value of the content items to the host platform in determining what to display in web content. Embodiments result in decreased blindness, increased user engagement, and increased value of the content items. Furthermore, embodiments described herein involve a new type of information, namely a minimum gap value, and a technique for modifying this new type of information.

System Overview

Figure 1:
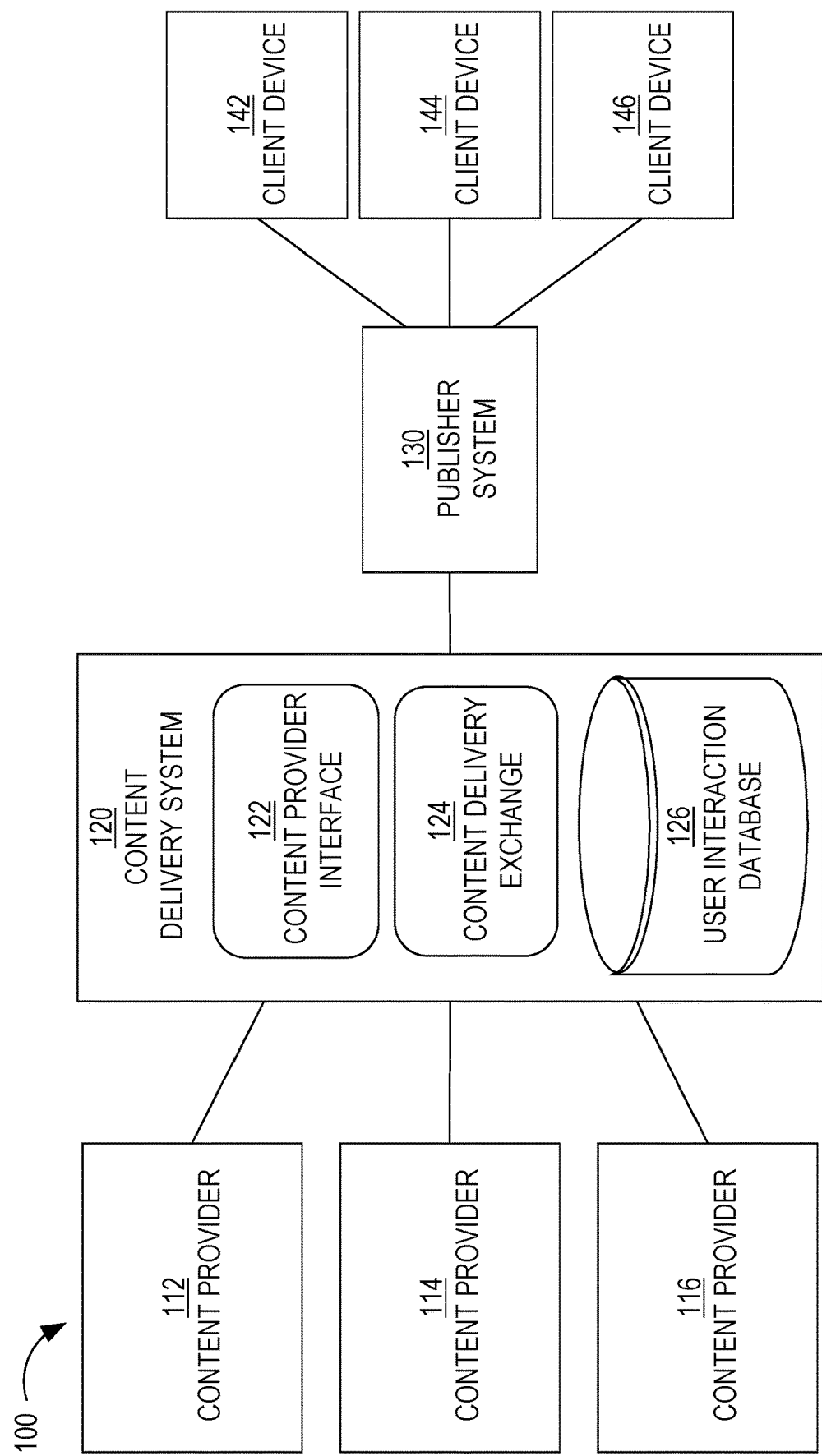
FIG. 1 is a block diagram that depicts a system for distributing content items to one or more end-users, in an embodiment.

FIG. 1 is a block diagram that depicts a system 100 for distributing content items to one or more end-users, in an embodiment. System 100 includes content providers 112-116, a content delivery system 120, a publisher system 130, and client devices 142-146. Although three content providers are depicted, system 100 may include more or less content providers. Similarly, system 100 may include more than one publisher and more or less client devices.

Content providers 112-116 interact with content delivery system 120 (e.g., over a network, such as a LAN, WAN, or the Internet) to enable content items to be presented, through publisher system 130, to end-users operating client devices 142-146. Thus, content providers 112-116 provide content items to content delivery system 120, which in turn selects content items to provide to publisher system 130 for presentation to users of client devices 142-146. However, at the time that content provider 112 registers with content delivery system 120, neither party may know which end-users or client devices will receive content items from content provider 112.

An example of a content provider includes an advertiser. An advertiser of a product or service may be the same party as the party that makes or provides the product or service. Alternatively, an advertiser may contract with a producer or service provider to market or advertise a product or service provided by the producer/service provider. Another example of a content provider is an online ad network that contracts with multiple advertisers to provide content items (e.g., advertisements) to end users, either through publishers directly or indirectly through content delivery system 120.

Although depicted in a single element, content delivery system 120 may comprise multiple computing elements and devices, connected in a local network or distributed regionally or globally across many networks, such as the Internet.

Thus, content delivery system 120 may comprise multiple computing elements, including file servers and database systems. For example, content delivery system 120 includes (1) a content provider interface 122 that allows content providers 112-116 to create and manage their respective content delivery campaigns and (2) a content delivery exchange 124 that conducts content item selection events in response to content requests from a third-party content delivery exchange and/or from publisher systems, such as publisher system 130.

Publisher system 130 provides its own content to client devices 142-146 in response to requests initiated by users of client devices 142-146. The content may be about any topic, such as news, sports, finance, and traveling. Publishers may vary greatly in size and influence, such as Fortune 500 companies, social network providers, and individual bloggers. A content request from a client device may be in the form of a HTTP request that includes a Uniform Resource Locator (URL) and may be issued from a web browser or a software application that is configured to only communicate with publisher system 130 (and/or its affiliates). A content request may be a request that is immediately preceded by user input (e.g., selecting a hyperlink on web page) or may be initiated as part of a subscription, such as through a Rich Site Summary (RSS) feed. In response to a request for content from a client device, publisher system 130 provides the requested content (e.g., a web page) to the client device.

Simultaneously or immediately before or after the requested content is sent to a client device, a content request is sent to content delivery system 120 (or, more specifically, to content delivery exchange 124). That request is sent (over a network, such as a LAN, WAN, or the Internet) by publisher system 130 or by the client device that requested the original content from publisher system 130. For example, a web page that the client device renders includes one or more calls (or HTTP requests) to content delivery exchange 124 for one or more content items. In response, content delivery exchange 124 provides (over a network, such as a LAN, WAN, or the Internet) one or more particular content items to the client device directly or through publisher system 130. In this way, the one or more particular content items may be presented (e.g., displayed) concurrently with the content requested by the client device from publisher system 130.

In response to receiving a content request, content delivery exchange 124 initiates a content item selection event that involves selecting one or more content items (from among multiple content items) to present to the client device that initiated the content request. An example of a content item selection event is an auction.

Content delivery system 120 and publisher system 130 may be owned and operated by the same entity or party. Alternatively, content delivery system 120 and publisher system 130 are owned and operated by different entities or parties.

A content item may comprise an image, a video, audio, text, graphics, virtual reality, or any combination thereof. A content item may also include a link (or URL) such that, when a user selects (e.g., with a finger on a touchscreen or with a cursor of a mouse device) the content item, a (e.g., HTTP) request is sent over a network (e.g., the Internet) to a destination indicated by the link. In response, content of a web page corresponding to the link may be displayed on the user's client device.

Examples of client devices 142-146 include desktop computers, laptop computers, tablet computers, wearable devices, video game consoles, and smartphones.

Bidders

In a related embodiment, system 100 also includes one or more bidders (not depicted). A bidder is a party that is different than a content provider, that interacts with content delivery exchange 124, and that bids for space (on one or more publisher systems, such as publisher system 130) to present content items on behalf of multiple content providers. Thus, a bidder is another source of content items that content delivery exchange 124 may select for presentation through publisher system 130. Thus, a bidder acts as a content provider to content delivery exchange 124 or publisher system 130. Examples of bidders include AppNexus, DoubleClick, and LinkedIn. Because bidders act on behalf of content providers (e.g., advertisers), bidders create content delivery campaigns and, thus, specify user targeting criteria and, optionally, frequency cap rules, similar to a traditional content provider.

In a related embodiment, system 100 includes one or more bidders but no content providers. However, embodiments described herein are applicable to any of the above-described system arrangements.

Content Delivery Campaigns

Each content provider establishes a content delivery campaign with content delivery system 120 through, for example, content provider interface 122. An example of content provider interface 122 is Campaign Manager™ provided by LinkedIn. Content provider interface 122 comprises a set of user interfaces that allow a representative of a content provider to create an account for the content provider, create one or more content delivery campaigns within the account, and establish one or more attributes of each content delivery campaign. Examples of campaign attributes are described in detail below.

A content delivery campaign includes (or is associated with) one or more content items. Thus, the same content item may be presented to users of client devices 142-146. Alternatively, a content delivery campaign may be designed such that the same user is (or different users are) presented different content items from the same campaign. For example, the content items of a content delivery campaign may have a specific order, such that one content item is not presented to a user before another content item is presented to that user.

A content delivery campaign is an organized way to present information to users that qualify for the campaign. Different content providers have different purposes in establishing a content delivery campaign. Example purposes include having users view a particular video or web page, fill out a form with personal information, purchase a product or service, make a donation to a charitable organization, volunteer time at an organization, or become aware of an enterprise or initiative, whether commercial, charitable, or political.

A content delivery campaign has a start date/time and, optionally, a defined end date/time. For example, a content delivery campaign may be to present a set of content items from Jun. 1, 2015 to Aug. 1, 2015, regardless of the number of times the set of content items are presented ("impressions"), the number of user selections of the content items (e.g., click throughs), or the number of conversions that resulted from the content delivery campaign. Thus, in this example, there is a definite (or "hard") end date. As another example, a content delivery campaign may have a "soft" end date, where the content delivery campaign ends when the corresponding set of content items are displayed a certain number of times, when a certain number of users view, select, or click on the set of content items, when a certain number of users purchase a product/service associated with the content delivery campaign or fill out a particular form on a website, or when a budget of the content delivery campaign has been exhausted.

A content delivery campaign may specify one or more targeting criteria that are used to determine whether to present a content item of the content delivery campaign to one or more users. (In most content delivery systems, targeting criteria cannot be so granular as to target individual members.) Example factors include date of presentation, time of day of presentation, characteristics of a user to which the content item will be presented, attributes of a computing device that will present the content item, identity of the publisher, etc. Examples of characteristics of a user include demographic information, geographic information (e.g., of an employer), job title, employment status, academic degrees earned, academic institutions attended, former employers, current employer, number of connections in a social network, number and type of skills, number of endorsements, and stated interests. Examples of attributes of a computing device include type of device (e.g., smartphone, tablet, desktop, laptop), geographical location, operating system type and version, size of screen, etc.

For example, targeting criteria of a particular content delivery campaign may indicate that a content item is to be presented to users with at least one undergraduate degree, who are unemployed, who are accessing from South America, and where the request for content items is initiated by a smartphone of the user. If content delivery exchange 124 receives, from a computing device, a request that does not satisfy the targeting criteria, then content delivery exchange 124 ensures that any content items associated with the particular content delivery campaign are not sent to the computing device.

Thus, content delivery exchange 124 is responsible for selecting a content delivery campaign in response to a request from a remote computing device by comparing (1) targeting data associated with the computing device and/or a user of the computing device with (2) targeting criteria of one or more content delivery campaigns. Multiple content delivery campaigns may be identified in response to the request as being relevant to the user of the computing device. Content delivery exchange 124 may select a strict subset of the identified content delivery campaigns from which content items will be identified and presented to the user of the computing device.

Instead of one set of targeting criteria, a single content delivery campaign may be associated with multiple sets of targeting criteria. For example, one set of targeting criteria may be used during one period of time of the content delivery campaign and another set of targeting criteria may be used during another period of time of the campaign. As another example, a content delivery campaign may be associated with multiple content items, one of which may be associated with one set of targeting criteria and another one of which is associated with a different set of targeting criteria. Thus, while one content request from publisher system 130 may not satisfy targeting criteria of one content item of a campaign, the same content request may satisfy targeting criteria of another content item of the campaign.

Different content delivery campaigns that content delivery system 120 manages may have different charge models. For example, content delivery system 120 (or, rather, the entity that operates content delivery system 120) may charge a content provider of one content delivery campaign for each presentation of a content item from the content delivery campaign (referred to herein as cost per impression or CPM). Content delivery system 120 may charge a content provider of another content delivery campaign for each time a user interacts with a content item from the content delivery campaign, such as selecting or clicking on the content item (referred to herein as cost per click or CPC). Content delivery system 120 may charge a content provider of another content delivery campaign for each time a user performs a particular action, such as purchasing a product or service, downloading a software application, or filling out a form (referred to herein as cost per action or CPA). Content delivery system 120 may manage only campaigns that are of the same type of charging model or may manage campaigns that are of any combination of the three types of charging models.

A content delivery campaign may be associated with a resource budget that indicates how much the corresponding content provider is willing to be charged by content delivery system 120, such as $100 or $5,200. A content delivery campaign may also be associated with a bid amount that indicates how much the corresponding content provider is willing to be charged for each impression, click, or other action. For example, a CPM campaign may bid five cents for an impression, a CPC campaign may bid five dollars for a click, and a CPA campaign may bid five hundred dollars for a conversion (e.g., a purchase of a product or service).

Content Item Selection Events

As mentioned previously, a content item selection event is when multiple content items (e.g., from different content delivery campaigns) are considered and a subset selected for presentation on a computing device in response to a request. Thus, each content request that content delivery exchange 124 receives triggers a content item selection event.

For example, in response to receiving a content request, content delivery exchange 124 analyzes multiple content delivery campaigns to determine whether attributes associated with the content request (e.g., attributes of a user that initiated the content request, attributes of a computing device operated by the user, current date/time) satisfy targeting criteria associated with each of the analyzed content delivery campaigns. If so, the content delivery campaign is considered a candidate content delivery campaign. One or more filtering criteria may be applied to a set of candidate content delivery campaigns to reduce the total number of candidates.

As another example, users are assigned to content delivery campaigns (or specific content items within campaigns) "off-line"; that is, before content delivery exchange 124 receives a content request that is initiated by the user. For example, when a content delivery campaign is created based on input from a content provider, one or more computing components may compare the targeting criteria of the content delivery campaign with attributes of many users to determine which users are to be targeted by the content delivery campaign. If a user's attributes satisfy the targeting criteria of the content delivery campaign, then the user is assigned to a target audience of the content delivery campaign. Thus, an association between the user and the content delivery campaign is made. Later, when a content request that is initiated by the user is received, all the content delivery campaigns that are associated with the user may be quickly identified, in order to avoid real-time (or on-the-fly) processing of the targeting criteria. Some of the identified campaigns may be further filtered based on, for example, the campaign being deactivated or terminated, the device that the user is operating being of a different type (e.g., desktop) than the type of device targeted by the campaign (e.g., mobile device).

A final set of candidate content delivery campaigns is ranked based on one or more criteria, such as predicted click-through rate (which may be relevant only for CPC campaigns), effective cost per impression (which may be relevant to CPC, CPM, and CPA campaigns), and/or bid price. Each content delivery campaign may be associated with a bid price that represents how much the corresponding content provider is willing to pay (e.g., content delivery system 120) for having a content item of the campaign presented to an end-user or selected by an end-user. Different content delivery campaigns may have different bid prices. Generally, content delivery campaigns associated with relatively higher bid prices will be selected for displaying their respective content items relative to content items of content delivery campaigns associated with relatively lower bid prices. Other factors may limit the effect of bid prices, such as objective measures of quality of the content items (e.g., actual click-through rate (CTR) and/or predicted CTR of each content item), budget pacing (which controls how fast a campaign's budget is used and, thus, may limit a content item from being displayed at certain times), frequency capping (which limits how often a content item is presented to the same person), and a domain of a URL that a content item might include.

An example of a content item selection event is an advertisement auction, or simply an "ad auction."

In one embodiment, content delivery exchange 124 conducts one or more content item selection events. Thus, content delivery exchange 124 has access to all data associated with making a decision of which content item(s) to select, including bid price of each campaign in the final set of content delivery campaigns, an identity of an end-user to which the selected content item(s) will be presented, an indication of whether a content item from each campaign was presented to the end-user, a predicted CTR of each campaign, a CPC or CPM of each campaign.

In another embodiment, an exchange that is owned and operated by an entity that is different than the entity that operates content delivery system 120 conducts one or more content item selection events. In this latter embodiment, content delivery system 120 sends one or more content items to the other exchange, which selects one or more content items from among multiple content items that the other exchange receives from multiple sources. In this embodiment, content delivery exchange 124 does not necessarily know (a) which content item was selected if the selected content item was from a different source than content delivery system 120 or (b) the bid prices of each content item that was part of the content item selection event. Thus, the other exchange may provide, to content delivery system 120, information regarding one or more bid prices and, optionally, other information associated with the content item(s) that was/were selected during a content item selection event, information such as the minimum winning bid or the highest bid of the content item that was not selected during the content item selection event.

Event Logging

Content delivery system 120 may log one or more types of events, with respect to content item summaries, across client devices 152-156 (and other client devices not depicted). For example, content delivery system 120 determines whether a content item summary that content delivery exchange 124 delivers is presented at (e.g., displayed by or played back at) a client device. Such an "event" is referred to as an "impression." As another example, content delivery system 120 determines whether a content item summary that exchange 124 delivers is selected by a user of a client device. Such a "user interaction" is referred to as a "click." Content delivery system 120 stores such data as user interaction data, such as an impression data set and/or a click data set. Thus, content delivery system 120 may include a user interaction database 128. Logging such events allows content delivery system 120 to track how well different content items and/or campaigns perform.

For example, content delivery system 120 receives impression data items, each of which is associated with a different instance of an impression and a particular content item summary. An impression data item may indicate a particular content item, a date of the impression, a time of the impression, a particular publisher or source (e.g., onsite v. offsite), a particular client device that displayed the specific content item (e.g., through a client device identifier), and/or a user identifier of a user that operates the particular client device. Thus, if content delivery system 120 manages delivery of multiple content items, then different impression data items may be associated with different content items. One or more of these individual data items may be encrypted to protect privacy of the end-user.

Similarly, a click data item may indicate a particular content item summary, a date of the user selection, a time of the user selection, a particular publisher or source (e.g., onsite v. offsite), a particular client device that displayed the specific content item, and/or a user identifier of a user that operates the particular client device. If impression data items are generated and processed properly, a click data item should be associated with an impression data item that corresponds to the click data item. From click data items and impression data items associated with a content item summary, content delivery system 120 may calculate a CTR for the content item summary.

Content Item Feeds

A content item feed is a set of content items that is presented on a screen of a client device. A content item feed (or simply "feed") includes user interface controls for scrolling through the feed. A user interface control for receiving user input to scroll through a feed is referred to as a scroll element or "thumb." Content items within feed may be scrolled up and down or side to side. comprises. A feed may have a limited number of content items or may be an "infinite" feed where, as the feed is being scrolled through (whether automatically or in response to user input), additional content items (that have not yet been presented in the feed) are presented.

A content item feed contains multiple types of content items. One type of content item (referred to herein as the "first type") is one that has been created by one of content providers 112-116 and that is associated with a content delivery campaign having targeting criteria that are used to identify the user or client device that is presenting the content item.

Another type of content item (referred to herein as the "second type") is content that is generated based on activity of users in an online network of the user that is viewing the content item. Examples of such a content item include a content item identifying an article authored by a friend or connection of the user in the online network, a content item identifying an article interacted with (e.g., selected, viewed, commented, liked, shared) by such a friend or connection, a content item identifying a change in a status of such a friend, a content item identifying news pertaining to an organization (e.g., company, academic institution, community organization) with which the user is associated or affiliated, or of which the user a member (e.g., as specified in the user's online social network). Such content items originate from content delivery system 120 and/or publisher system 130.

Another type of content item (referred to herein as the "third type") is a content item indicating a type of content in which content delivery system 120 (or an affiliated system) predicts the user might be interested. Examples of types of recommended content include people (i.e., potential friends/connections), jobs, and video courses. Such content items do not originate from content providers 112-116 and are not part of a content delivery campaign. However, the source of the jobs and the authors/providers of the video courses may be third-party entities relative to content delivery system 120 and/or publisher system 130.

Ranking Content Items in a Feed

The number of content items that may be presented to a user in a content item feed may be practically limitless. Thus, to ensure user engagement and interest in the content item feed, content delivery system 120 (or publisher system 130) ranks the possible content items according to one or more ranking criteria. Example ranking criteria include actual user selection rate of a content item, predicted user selection rate of each content item, and value to content delivery system 120 or publisher system 130. The "value" may be a bid value that represents how much a content provider (e.g., content provider 112) will compensate content delivery exchange 120 for presenting the content item or if the user selects the content item. "Value" may correspond to another metric, such as a value to publisher system 130 if the content item is selected. Different types of content items (e.g., second type versus third type), different content items of the first type, and different sub-types of content items (e.g., job recommendations versus course recommendations) may be associated with different values.

Content Item Blindness

If content items of a particular type are displayed too frequently, then users may become "blind" to that type of content item. "Blindness" is a phenomenon where a user or group of users consciously or subconsciously ignore content items of a particular type when browsing a content item feed. Such content items become "invisible" to the user(s). Increased blindness of certain types of content items may have multiple negative consequences, such as decreased user engagement with publisher system 130 and a decrease in long term monetization power of content delivery system 120.

Based on experiments, a correlation exists between blindness and density of content items of a particular type. "Density" refers to how frequently content items of a particular type appear in content item feed. 100% density of a particular type means that the entire feed contains content items of the particular type. Similarly, 10% density means that 10% of the content items in a feed are of the particular type. Even spacing between content items may be enforced. For example, enforcing even spacing of 33% density of a particular type of content item means that every third content item in a feed is of the particular type.

As density increases, blindness tends to increase. Conversely, as density decreases, users can unlearn and increase selection (e.g., click) propensity to some extent.

Parameters for Placing Content Items of the First Type within a Feed

In an embodiment, content delivery system 120 or publisher system 130 ensures that content items of the first type are not presented too frequently within a single content item feed. Multiple parameters may be used to determine where and how often content items of the first type appear in a feed. One parameter is "minimum gap" whose value defines a minimum gap between two consecutive content items of the first type. For example, a minimum gap of four indicates that there must be at least four content items of the second type or third type between two content items of the first type. Another parameter is "top slot" whose value defines the highest position where content items of the first type can be shown in a content item feed. For example, if top slot is three, then the highest ranked content item of the first type may be placed in the third slot in the feed, but no higher.

Another parameter is "shadow bid." The value of shadow bid indicates a value of user engagement with publisher system 130. Shadow bid is a value for both content items of the first type (e.g., advertisements) and content items of other types, such as organic content items. In one approach, shadow bid is a constant value for all content items, regardless of type.

When determining whether to insert a content item of the first type or a content item of a second type in a slot of a content item feed, at least two content items are considered: (1) the top ranked content item from a first set of ordered set of content items of the first type and (2) the top ranked content item from a second set of ordered set of content items of the second type. If there are additional types and they are treated separately from each other, then there may be one or more other sets of content items of those types. Each slot represents an opportunity to raise revenue and/or increase engagement. While content items of the first type result in revenue if displayed or selected, content items of the second type generally do not result in revenue when displayed or selected. Those, for content items of the second type, their overall value comes in the form of the shadow bid and the probability of being selected (or otherwise interacted with).

In contrast, the probability of interacting with (e.g., selecting) content items of the first type may be much lower than the probability of interacting with content items of other types. Because shadow bid is combined with (e.g., multiplied by) the probability of user engagement, the higher the shadow bid, the more likely the overall value of a content item of a second type will exceed the value of a content item of the first type.

If shadow bid is the only one of these three parameters that is defined, then it would be possible that (a) very few or no content items of the first type would be presented in a content item feed or (b) the content item feed might almost entirely consist of content items of the first type. Either scenario is not ideal since the former (a) would result in little revenue and the latter (b) might result in user disengagement from publisher system 130 altogether.

Modifying Minimum Gap

In an embodiment, a first minimum gap value that is used to determine where to place content items in a first feed is modified based on performance data to generate a second minimum gap value. The performance data may correspond to one or more measurements of performance. Example measurements of performance include, user selection rate of content items of the first type, revenue generated from content items of the first type, and user engagement in content from publisher system 130, such as content items of the second and/or third type.

For example, if the user selection rate of content items of the first type increases, then the first minimum gap value decreases (or the second minimum gap value that is determined is less than the first minimum gap value). As another example, if the user selection rate of content items of the first type increases a particular amount (e.g., 10% from a previous measurement, 0.9% in absolute terms, or past a predefined threshold), then the first minimum gap value decreases. As another example, if user engagement decreases, then the first minimum gap value increases (or the second minimum gap value that is determined is greater than the first minimum gap value).

The change in a minimum gap value may be a fixed amount (e.g., +/−1 in minimum gap value) or may be a variable amount (e.g., sometimes +/−1 while other times +/−2). If the latter, the variable amount may be determined based on the extent to which the performance data changes from one time period to another. For example, if user selection rate decreases by at least X % (e.g., 30%) over the last day, then the minimum gap value increases by N (e.g., 3). As another example, if user engagement on a platform increases by Y amount (e.g., +100K) over three days, then the minimum gap value decreases by M (e.g., 2).

When the second minimum gap value is determined, the second minimum gap value may be used for future content item feeds. Thus, the space between consecutive content items of the first type will be based on the (new) second minimum gap value.

Example Process

Figure 2:
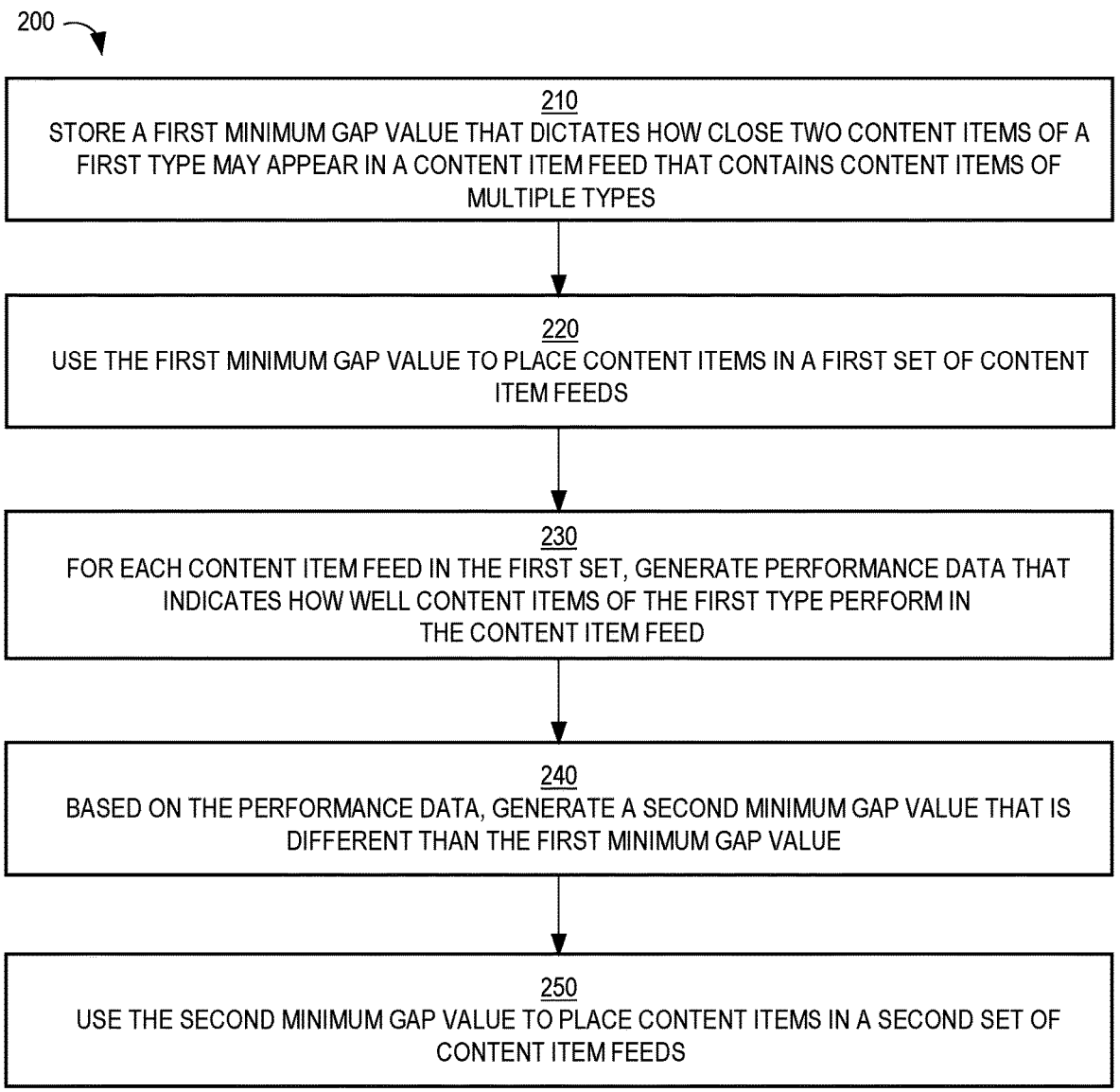
FIG. 2 is a flow diagram that depicts an example process for adjusting a minimum gap value for content items of a particular type, in an embodiment.

FIG. 2 is a flow diagram that depicts an example process 200 for adjusting a minimum gap value for content items of the first type, in an embodiment.

At block 210, a first minimum gap value is stored that dictates how close two content items of a first type may appear in a content item feed that contains content items of multiple types.

At block 220, the first minimum gap value is used to place content items in a first set of content item feeds. Different feeds in the first set of content item feeds are associated with different users. Additionally or alternatively, at least two feeds in the first set of content item feeds are presented to the same user (e.g., at different times).

At block 230, for each content item feed in the first set of content item feeds, performance data is generated that indicates how well content items of the first type perform in the content item feed. The performance data may be an average, median, or other percentile user selection rate.

At block 240, based on the performance data, a second minimum gap value is generated that can be different than the first minimum gap value. For example, if the performance data is above a first threshold, then the second minimum gap value is set to be lower than the first minimum gap value. Conversely, if the performance data is below a second threshold, then the second minimum gap value is set to be higher than the first minimum gap value. If the performance data holds at a desired level or is within a certain range of values, then the second minimum gap value may be the same as the first minimum gap value.

At block 250, the second minimum gap value is used to place content items in a second set of content item feeds. The second set of content item feeds may be associated with the same user or set of users as the first set of content item feeds.

Controller-Based Framework for Modifying Minimum Gap

In an embodiment, a controller-based framework is used to modify a minimum gap value. An example of a type of controller in such a framework is a proportional-integral-derivative (PID) controller. A PID controller continuously calculates an error value as a difference between a target value and a measured (or current) value and applies a correction based on proportional, integral, and derivative terms. An example of accurate and responsive correction to a control function is cruise control on a vehicle. The PID controller restores a current speed to the desired or target speed in an optimal way by controlling the power output of the vehicle's engine.

Certain parameters of a PID controller are initialized at the beginning of the PID process. In an embodiment, parameters include a current user selection rate (or CTR) (e.g., $y_0$), a current revenue (e.g., $r_0$), and a current minimum gap value (e.g., $a_0=6$). Also, a target value (e.g., z) is defined as the current user selection rate multiplied by the summation of 1 plus a lift value (e.g., 0.05) (e.g., $z=y_0*(1+lift)$). Also, an error parameter or variable is defined and, optionally, initialized to 0 (e.g., $e_0=0$).

Once these parameters are initialized, the following process may be performed continuously (e.g., while t=1 to T do):
  a. determine a current user selection rate and a current revenue (e.g., observer $y_t$, $r_t$))
  b. determine a current error value based on a difference between the target value and the current user selection rate (e.g., $e_t=z-y_t$)
  c. determine a proportional value as a proportional weight multiplied by the current error value (e.g., $P=Kp*e_t$)
  d. determine an integral value as a proportional weight multiplied by the current error value (e.g., $I=Ki*\int_{\tau=1} e_\tau$)
  e. determine a derivative value as a derivative weight multiplied by the current error value (e.g., $D=Kd*de/dt$)
  f. determine a control signal (e.g., $u_t$) that is based on the proportional value, integral value, and derivative value (e.g. $u_t=P+I+D$)
  g. determine a next minimum gap value (e.g., $a_{t+1}$) based on the control signal.

There are at least two ways to determine the next minimum gap value based on the control signal. Those ways are described in the next two sections below.

Constraint-on-Objective Technique

In an embodiment, a forecast of a user selection rate and of another objective is based on different possible values for the minimum gap value. The different possible values may be constrained to an absolute minimum gap value (e.g., 3) and/or an absolute maximum gap value (e.g., 9). An example of the other objective is revenue. The following description is based on this example objective, although other embodiments may involve a different objective.

A forecast of a user selection rate given a possible minimum gap value may be determined based on a history of user selection rates given that possible minimum gap value. The forecast may be calculated using a rule-based model or a machine-learned model that is trained based on multiple training instances, each labeled with a user selection rate and one of the features being a minimum gap value during the time corresponding to user interaction data that was used to calculate that user selection rate.

The forecast of a user selection rate given a possible minimum gap value can be learned by a time-series model or a regression model. For time-series models, the input is a sequence of user selection rates ordered by time (date), the prediction output is the future (e.g., next day or next t days) user selection rate(s). The prediction is mainly based on the pattern (e.g., trend, seasonality) of the user selection propensity under a given minimum gap. A regression model takes a list of features and assumes the prediction output is a function of the given list of features. By fitting the training data (previous observed data), the regression model estimates the function and predicts for future user selection rate. The features can include user profiles (e.g., industry, location), platforms (e.g., mobile or desktop), member behaviors on content items of a particular type (e.g., reflected in previous user selection rates), and other online activities on publisher system 130, such as whether the user recently applied to one or more jobs.

Similarly, a forecast of revenue (the other objective in this example) given a possible minimum gap value may be determined based on a history of revenue given that possible minimum gap value. The forecast may be calculated using a rule-based model or a machine-learned model that is trained based on multiple training instances, each labeled with a revenue amount and one of the features being a minimum gap value that immediately preceded that revenue amount. The same type of model and features for forecasting user selection rate may be used to forecast revenue.

After a forecast of user selection rate is made for a possible minimum gap value (e.g., $y_{t+1}(a)$), a delta value (e.g., $\delta$) is calculated for the possible minimum gap value, where the delta value (e.g., $\delta(a)$) is based on a difference between the forecasted user selection rate for that possible minimum gap value and a summation of the current user selection rate and the control signal (e.g., $\delta(a)=y_{t+1}(a)-(y_t+u_t)$).

Once a delta value is calculated for each possible minimum gap value, then the minimum gap value that results in the highest revenue subject to one or more conditions is returned and used as the next minimum gap value ($a_{t+1}=\mathrm{argmax}_a(r_{t+1})$ where $\delta(a) \geq 0$). An example of the one or more conditions is that the delta value is greater than a particular threshold (e.g., $\delta(a) \geq 0$), such as greater than or equal to 0, which ensures that the forecasted user selection rate is equal to or higher than the desired target. Out of all possible minimum gap values that satisfy $\delta(a) \geq 0$, the one with the highest revenue gain is selected.

This constraint-on-revenue technique assumes that the value in each action depends on whether the action can maximize revenue and reach the specified target.

Heuristic Assumption Technique

The heuristic assumption technique utilizes the observation that lower density of content items of the first type results in lower amount of another objective (e.g., revenue). Thus, in an embodiment, the current minimum gap value is tuned step by step until the target objective (e.g., user selection rate) is achieved. For example:

a. if the control signal is 0 (e.g., $u_t=0$), then the minimum gap value remains the same (e.g., $a_{t+1}=a_t$)
b. if the control signal is greater than 0 (e.g., $u_t>0$), then the new/updated minimum gap value is set to be the minimum of (1) the current minimum gap value plus a pre-defined value (e.g., 1) and (2) an absolute maximum value for the minimum gap value (e.g., 9) (e.g., $a_{t+1}=\min(a_t+1, 9)$)
c. if the control signal is less than 0 (e.g., $u_t<0$), then the new/updated minimum gap value is set to be the maximum of (1) the current minimum gap value minus a pre-defined value (e.g., 1) and (2) an absolute minimum value for the minimum gap value (e.g., 3) (e.g., $a_{t+1}=\max(a_t-1, 3)$)

Segment-Specific Minimum Gap Values

In an embodiment, a minimum gap value is determined for different users or segments of users. Thus, different content item feeds are associated with different minimum gap values.

A segment may be defined based on one or more criteria. For example, users that visit publisher system 130 every day are assigned to a first segment, users that visit publisher system 130 at least once per week but not daily are assigned to a second segment, users that visit publisher system 130 at least one per month but not weekly are assigned to a third segment, and users that visit publisher system 130 less frequently are assigned to a fourth segment.

As another example, users that have a user selection rate within a first range (e.g., greater than 5%) are assigned to a first segment, users that have a user selection rate within a second range (e.g., between 3% and 5%) are assigned to a second segment, users that have a user selection rate within a third range (e.g., between 1% and 3%) are assigned to a third segment, and users that have a user selection rate within a fourth range (e.g., less than 1%) are assigned to a fourth segment. Embodiments are not limited to the number of segments or how each segment is defined. However, is it important to define meaningful and stable segments. Minimum gap values can be control based on segment because it is assumed that, within one segment, users are very similar.

Offline Workflow

Figure 3:
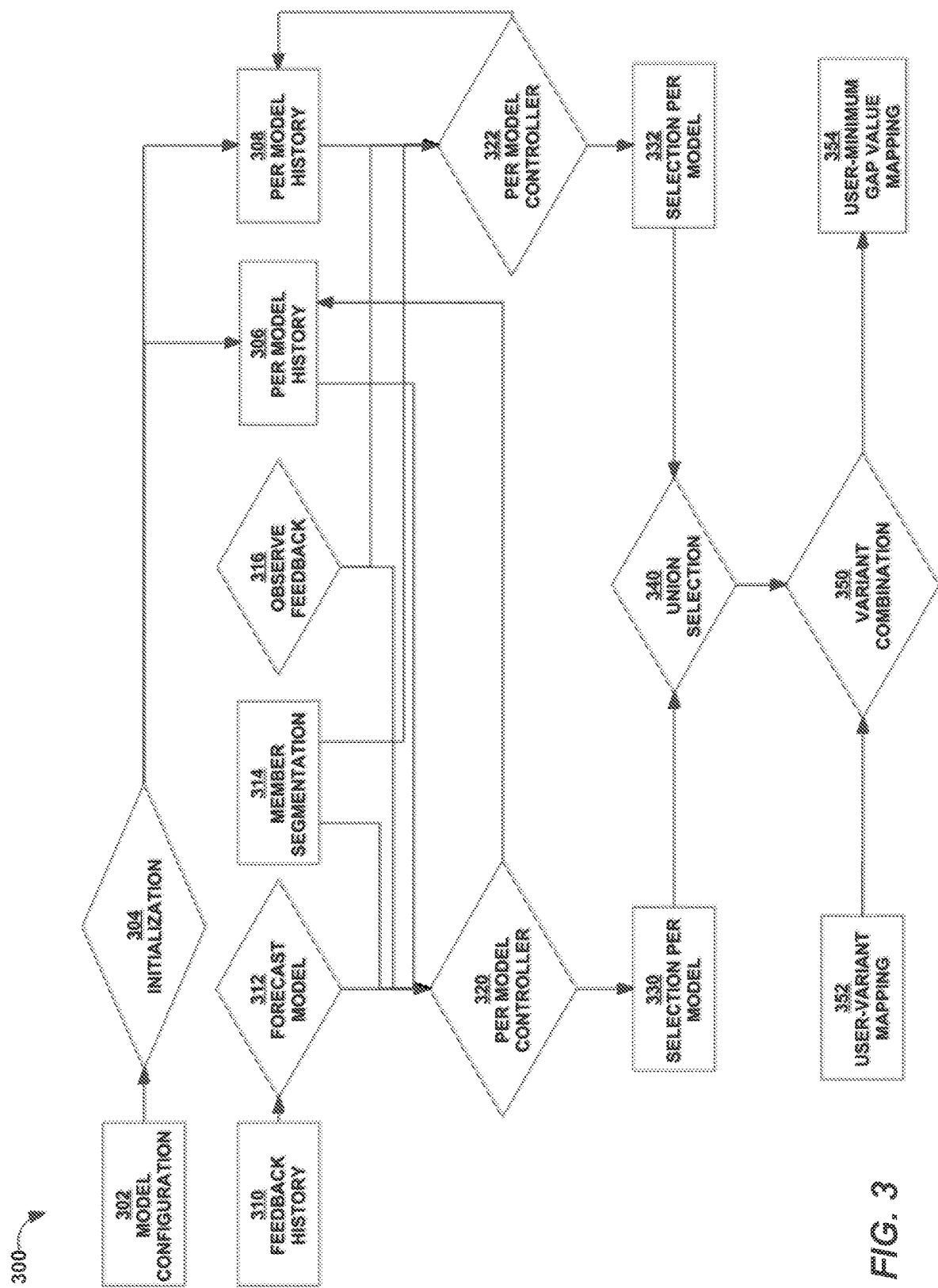
FIG. 3 is a block diagram that depicts an example workflow for updating minimum gap values using different techniques and for different segments, in an embodiment.

FIG. 3 is a block diagram that depicts an example workflow 300 for updating minimum gap values using different techniques and for different segments, in an embodiment. Workflow 300 may be implemented by content delivery system 120, publisher system 130, another computer system (not depicted in FIG. 1), or any combination thereof.

Each rectangular element in workflow 300 corresponds to data and each diamond element in workflow 300 corresponds to a process or a job.

Initialization 304 accepts, as input, model configuration 302 and generates, as output, an initial history for each model. Although only two models are depicted in workflow 300, workflow 300 may support multiple models/variants at the same time.

Model configuration 302 includes, for each model, model specifications, such as a model identifier, parameters (e.g., Kp, Ki, Kd, etc.), a target (e.g., for CTR), and a V-function (whether constraint on objective technique or heuristic assumption technique). V-function refers to "value function" and represents how good is a state for an agent to be in. The value function is equal to the expected total reward for the controller starting from each state (i.e., a minimum gap in this scenario).

Per-model history 306 includes history information about a particular model and each segment of multiple segments, a target for each segment, one or more past errors (e.g., $e_t$) for each segment (e.g., a difference between a target value and an actual value), and one or more past control signals (e.g., $u_t$) for each segment. Thus, different segments may be associated with different targets. Also, the target may change from time to time (such as where there is a business need), in which case the error (e.g., $e_t$) may be computed based on the new target. For example, the initial target may be a 2% lift in current revenue. Once it is achieved for a while, the target may be changed to a 1% lift in current revenue. Due to the seasonality in the system, different targets may be set in different quarters or other time periods. When the target changes, the error term is reset to 0.

Similarly, per-model history 308 includes history information about another model and each segment of multiple segments, a target for each segment, one or more past errors (e.g., $e_t$) for each segment, and one or more past control signals (e.g., $u_t$) for each segment. Thus, per-model history 306 corresponds to a first model and a per-model history 308 corresponds to a second model that is different than the first model. For example, the first model may be based on the constraint-on-objective technique while the second model may be based on the heuristic assumption technique.

Also, the segment definition for one model may be different than the segment definition for another model. For example, one model may have three segments while another model may have four segments. As another example, a segment for one model may be defined by the frequency of user activities on their respective content item feeds, while for another model, the segment is defined by geographic location of users.

Each per-model history is input to one of per-model controllers 320 and 322. Other inputs to per-model controller 320 include output from forecast model 312, member segmentation data 314, and observe feedback 316. Inputs to per-model controller 322 include member segmentation data 314 and observe feedback 316.

Forecast model 312 produces a forecast of a user selection rate for a segment given a possible minimum gap value and a forecast of a certain objective (e.g., revenue) for a segment given a possible minimum gap value. Input to forecast model 312 is feedback history 310, which includes the past N days of feedback (e.g., a user selection rate and revenue) per segment and an actual minimum gap value of that segment during a previous time period. For example, different time periods (e.g., days) may be different with different actual minimum gap values.

Member segmentation data 314 includes a user/member identifier-to-segment mapping that maps user/member identifiers to segments. Each user/member identifier is mapped to one or more segments. For a given segment definition, one user is mapped to a single segment. However, since there may be multiple models and each model has a segment definition, one user can be mapped to multiple segments.

A user is assigned to a segment based on one or more attributes or characteristics of the user. For example, online activity of a user is analyzed to determine to which segment the user is to be assigned. As another example, one or more profiles attributes of a user's profile are considered for assigning the user to a segment. A segment assignment may be based on a combination of online activity and user profile attributes. Multiple controllers/models may be experimented with at the same time by splitting users into multiple experimental buckets. For users in a given experimental bucket, those users will be "controlled" by a single controller/model at a time.

Observe feedback 316 determines current user selection rate for each segment and a current objective value (e.g., revenue amount) for each segment. Such information may be retrieved from another service or component, not depicted. Output of observe feedback 316 is input to per-model controllers 320 and 322.

In an embodiment, the feedback of interest is not limited to user selection rate and a single objective, such as revenue. Other feedback that may be considered include user selection rate to other types of content items (e.g., organic content items), user engaged session counts, length of user engaged sessions, etc. Such feedback may be added into the constrained optimization framework. One constrained optimization problem is formulated as follows:

maximize revenue, s.t. user selection rate to content items of the first type>=target.

If user engaged sessions are also monitored, then the formulation may change as follows:

maximize revenue, s.t. user selection rate to content items of the first type>=target; user engaged sessions>=threshold where threshold is the desired value for the user engaged sessions. There is still one target and the error terms for this target of which to keep track. The other feedback (user selection rate and user engaged sessions, in this example) is used for the constrained problem, not for controlling.

Per-model controllers 320 and 322 pertain to different models. Per-model controller 320 determines, for each segment, an updated minimum gap value based on the forecast (for that segment) produced by forecast model 312, member segmentation data 314, output from observe feedback 316, and per-model history 306. For example, per-model controller 320 implements the constraint-on-objective technique. The updated minimum gap value may be the same as or different than the most recent minimum gap value. The updated minimum gap value is used to update per-model history 306.

Per-model controller 320 stores the updated minimum gap value in selection per model 330. Thus, selection per model 330 includes a minimum gap value for each segment associated with the corresponding model.

Similarly, per-model controller 322 determines, for each segment, an updated minimum gap value based on member segmentation data 314, output from observe feedback 316, and per-model history 308. For example, per-model controller 322 implements the heuristic assumption technique. The updated minimum gap value for a segment may be the same as or different than the most recent minimum gap value for that segment. The updated minimum gap value is used to update per-model history 308.

Per-model controller 322 stores the updated minimum gap value in selection per model 332. Thus, selection per model 332 includes a minimum gap value for each segment associated with the corresponding model.

Union selection 340 unions or combines selection per models 330 and 332 and outputs the union to variant combination 350. Variant combination 350 accepts the union and a user-variant mapping 352 as input. User-variant mapping 352 maps each individual user to a variant. A variant is a specific experimental bucket, which contains a set of user/member identifiers. A variant is mapped to a specific model. Variant combination 350 generates, as output, a user/member-to-minimum gap value mapping 354 that maps different user/member identifiers to minimum gap values.

This mapping is used to update a minimum gap value attribute for each user/member. Later, when a user logs into a system (e.g., publisher system 130), publisher system 130 looks up attributes of the user, including a minimum gap value, and applies the minimum gap value when presenting content items of various types in a content item feed for the user.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
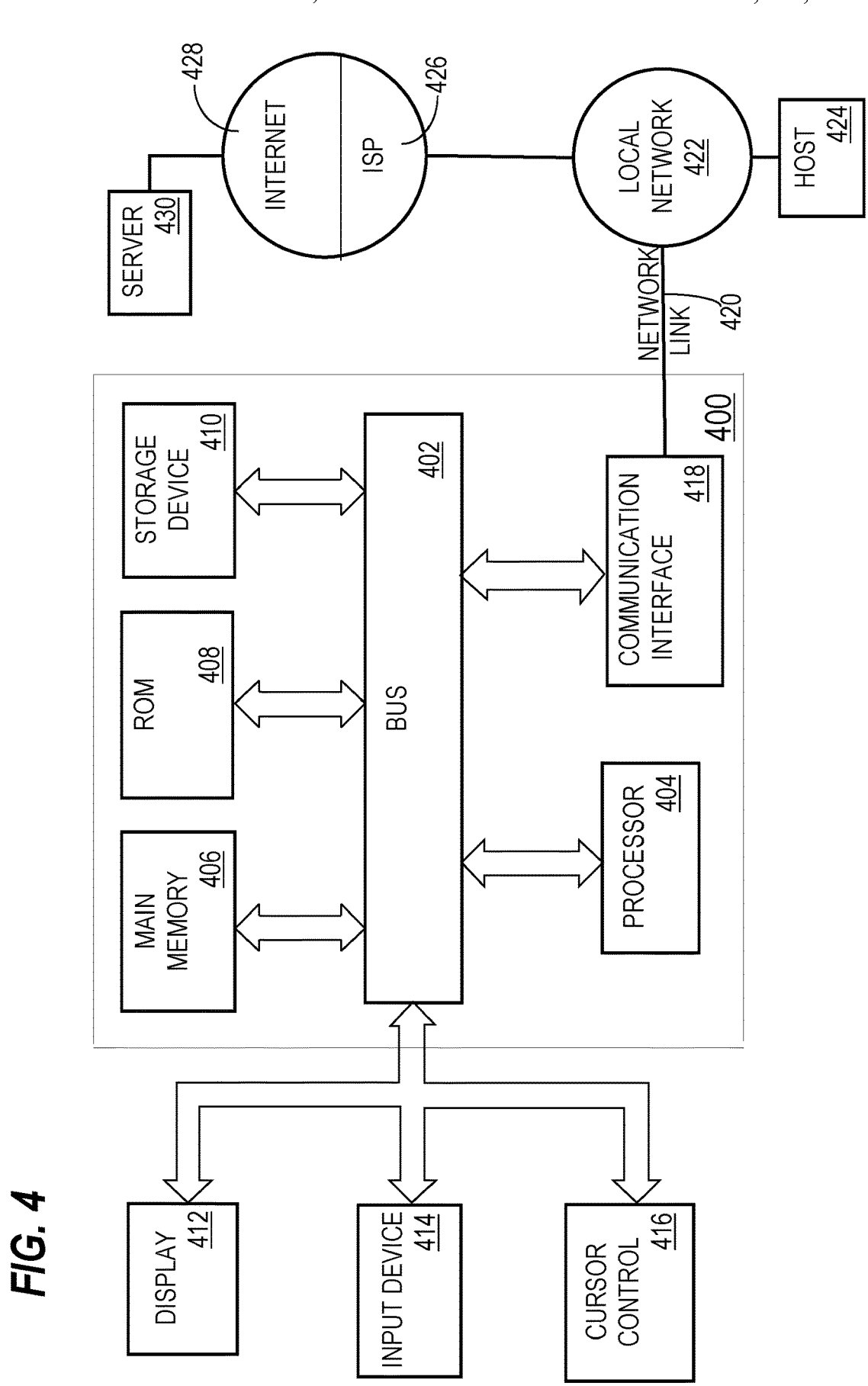
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method performed by a content delivery system, the method comprising:
    storing a first minimum gap value that indicates a minimum number of slots, in a scrollable content item feed, between two content items that are of a first type and that are from different content providers that are separate from the content delivery system, wherein the scrollable content item feed is presented on a screen of a computing device of a user and contains content items of a plurality of types that includes the first type and a second type that is different than the first type, wherein multiple content items in the scrollable content item feed are presented concurrently on the screen of the computing device;
    using the first minimum gap value to place, in real-time, content items in a first plurality of scrollable content item feeds;
    for each scrollable content item feed of the first plurality of scrollable content item feeds, generating performance data that includes one or more measures of performance of content items of the first type in said each scrollable content item feed;
    based on the performance data and the first minimum gap value, generating a second minimum gap value that is different than the first minimum gap value;
    using the second minimum gap value to place, in real-time, content items in a second plurality of scrollable content item feeds;
    wherein the method is performed by one or more computing devices.

2. The method of claim 1, wherein the second minimum gap value is associated with a first set of users, wherein the second plurality of scrollable content item feeds are displayed to users in the first set of users, further comprising:
    while the second minimum gap value is associated with the first set of users, storing a third minimum gap value that is different than the second minimum gap value and that is associated with a second set of users that is different than the first set of users.

3. The method of claim 2, wherein online activity of each user in the first set of users satisfy a first set of criteria and online activity of each user in the second set of users satisfy a second set of criteria.

4. The method of claim 3, wherein the online activity is a user selection rate, a number of user selections, a number of visits to a particular website or online portal, or a number of content item feed interactions.

5. The method of claim 1, further comprising:
    storing a target user selection rate with respect to content items of the first type;
    determining a current user selection rate with respect to content items of the first type;
    determining a difference between the target user selection rate and the current user selection rate;
    updating the second minimum gap value based on the difference.

6. The method of claim 5, wherein the second minimum gap value is associated with a first set of users, wherein the second plurality of scrollable content item feeds are displayed to users in the first set of users, further comprising:
    storing, in association with a second set of users that is different than the first set of users, a second target user selection rate with respect to content items of the first type;
    determining a second current user selection rate of the second set of users with respect to content items of the first type;
    determining a second difference between the second target user selection rate and the second current user selection rate;
    based on the second difference, updating a third minimum gap that is associated with the second set of users.

7. The method of claim 5, further comprising:
    determining a proportional value based on the difference and a proportional weight;
    determining an integral value based on an integral of the difference and an integral weight;
    determining a derivative value based on a derivative of the difference and a derivative weight;
    generating a controller value based on the proportional value, the integral value, and the derivative value;
    wherein updating the second minimum gap value is also based on the controller value.

8. The method of claim 7, wherein the difference is a user selection rate difference, further comprising:
    for each possible minimum gap value in a plurality of possible minimum gap values:
        generating, based on said each possible minimum gap value, a forecasted user selection rate and a forecasted revenue;

calculating a particular difference between the forecasted user selection rate and a summation of the current user selection rate and the user selection rate difference;

identifying a particular minimum gap value in the plurality of possible minimum gap values that is associated with the highest forecasted revenue given a particular condition associated with the particular minimum gap value is satisfied.

9. The method of claim 8, wherein the particular condition is that the particular difference associated with the particular minimum gap value must be greater than a particular value.

10. The method of claim 7, further comprising:
if the controller value is greater than a particular value, then establishing a current minimum gap value as a minimum of a maximum gap value or a first summation of the second minimum gap value and a positive value;
if the controller value is not greater than the particular value, then establishing the current minimum gap value as a maximum of an absolute minimum gap value or a second summation of the second minimum gap value and a negative value.

11. One or more storage media storing instructions which, when executed by one or more processors, cause:
storing, by a content delivery system, a first minimum gap value that indicates a minimum number of slots, in a scrollable content item feed, between two content items that are of a first type and that are from different content providers that are separate from the content delivery system, wherein the scrollable content item feed is presented on a screen of a computing device of a user and contains content items of a plurality of types that includes the first type and a second type that is different than the first type, wherein multiple content items in the scrollable content item feed are presented concurrently on the screen of the computing device;
using the first minimum gap value to place, in real-time, content items in a first plurality of scrollable content item feeds;
for each content item feed of the first plurality of scrollable content item feeds, generating performance data that includes one or more measures of performance of content items of the first type in said each content item feed;
based on the performance data and the first minimum gap value, generating a second minimum gap value that is different than the first minimum gap value;
using the second minimum gap value to place, in real-time, content items in a second plurality of scrollable content item feeds.

12. The one or more storage media of claim 11, wherein the second minimum gap value is associated with a first set of users, wherein the second plurality of scrollable content item feeds are displayed to users in the first set of users, wherein the instructions, when executed by the one or more processors, further cause:
while the second minimum gap value is associated with the first set of users, storing a third minimum gap value that is different than the second minimum gap value and that is associated with a second set of users that is different than the first set of users.

13. The one or more storage media of claim 12, wherein online activity of each user in the first set of users satisfy a first set of criteria and online activity of each user in the second set of users satisfy a second set of criteria.

14. The one or more storage media of claim 13, wherein the online activity is a user selection rate, a number of user selections, a number of visits to a particular website or online portal, or a number of content item feed interactions.

15. The one or more storage media of claim 11, wherein the instructions, when executed by the one or more processors, further cause:
storing a target user selection rate with respect to content items of the first type;
determining a current user selection rate with respect to content items of the first type;
determining a difference between the target user selection rate and the current user selection rate;
updating the second minimum gap value based on the difference.

16. The one or more storage media of claim 15, wherein the second minimum gap value is associated with a first set of users, wherein the second plurality of scrollable content item feeds are displayed to users in the first set of users, wherein the instructions, when executed by the one or more processors, further cause:
storing, in association with a second set of users that is different than the first set of users, a second target user selection rate with respect to content items of the first type;
determining a second current user selection rate of the second set of users with respect to content items of the first type;
determining a second difference between the second target user selection rate and the second current user selection rate;
based on the second difference, updating a third minimum gap that is associated with the second set of users.

17. The one or more storage media of claim 15, wherein the instructions, when executed by the one or more processors, further cause:
determining a proportional value based on the difference and a proportional weight;
determining an integral value based on an integral of the difference and an integral weight;
determining a derivative value based on a derivative of the difference and a derivative weight;
generating a controller value based on the proportional value, the integral value, and the derivative value;
wherein updating the second minimum gap value is also based on the controller value.

18. The one or more storage media of claim 17, wherein the difference is a user selection rate difference, wherein the instructions, when executed by the one or more processors, further cause:
for each possible minimum gap value in a plurality of possible minimum gap values:
generating, based on said each possible minimum gap value, a forecasted user selection rate and a forecasted revenue;
calculating a particular difference between the forecasted user selection rate and a summation of the current user selection rate and the user selection rate difference;
identifying a particular minimum gap value in the plurality of possible minimum gap values that is associated with the highest forecasted revenue given a particular condition associated with the particular minimum gap value is satisfied.

19. The one or more storage media of claim 17, wherein the instructions, when executed by the one or more processors, further cause:
if the controller value is greater than a particular value, then establishing a current minimum gap value as a minimum of a maximum gap value or a first summation of the second minimum gap value and a positive value;

if the controller value is not greater than the particular value, then establishing the current minimum gap value as a maximum of an absolute minimum gap value or a second summation of the second minimum gap value and a negative value.

20. The method of claim 1, wherein the one or more measures of performance include one or more of user selection rate of content items of the first type, revenue generated from content items of the first type, and user engagement in content of the second type or of a third type that is different than the first type and the second type.

\* \* \* \* \*